United States Patent
Chen

(10) Patent No.: US 6,936,745 B2
(45) Date of Patent: Aug. 30, 2005

(54) SELECTIVE POLYMER WRAPPING OF RADIOACTIVE MATERIALS

(75) Inventor: Muguo Chen, Bedford Hills, NY (US)

(73) Assignee: eVionX, Inc., Elmsford, NY (US)

( * ) Notice: Subject to any disclaimer, the term of this patent is extended or adjusted under 35 U.S.C. 154(b) by 547 days.

(21) Appl. No.: 10/045,900

(22) Filed: Jan. 14, 2002

(65) Prior Publication Data

US 2003/0030158 A1 Feb. 13, 2003

Related U.S. Application Data

(60) Provisional application No. 60/261,126, filed on Jan. 12, 2001.

(51) Int. Cl.7 .................................................. G21F 9/16
(52) U.S. Cl. .......................................... 588/8; 588/255
(58) Field of Search ................................. 588/6, 8, 253, 588/255

(56) References Cited

U.S. PATENT DOCUMENTS

| | | | | | |
|---|---|---|---|---|---|
| 4,077,901 A | * | 3/1978 | Arnold et al. | .................. | 588/8 |
| 4,131,563 A | * | 12/1978 | Bahr et al. | ...................... | 588/8 |
| 4,358,401 A | * | 11/1982 | O'Brien et al. | ................ | 588/8 |
| 4,379,763 A | * | 4/1983 | Clemens et al. | ............... | 588/8 |

* cited by examiner

*Primary Examiner*—Edward M. Johnson
(74) *Attorney, Agent, or Firm*—Ralph J. Crispino

(57) ABSTRACT

A selective polymer-wrapping process is disclosed which is capable of exclusively wrapping radioactive particles from solid waste streams at room temperature. Accordingly, separation of wrapped radioactive particles from unwrapped non-radioactive particles is facilitated. The method includes exposing radioactive particles or material, alone or in combination with other materials, to a precursor monomer solution that is capable of polymerizing due to the inherent radiation of the radioactive material, whereby the radioactive material is partially or totally encapsulated in the resultant polymer.

15 Claims, 1 Drawing Sheet

●: Non-radioactive particles;   ★: Radioactive particles

SELECTIVE POLYMER WRAPPING OF RADIOACTIVE MATERIALS

RELATED CASES

This application claims priority to U.S. Provisional Application Ser. No. 60/261,126, filed Jan. 12, 2001 entitled NUCLEAR WASTE SEPARATION AND COLLECTING, which is incorporated by reference herein.

FIELD OF THE INVENTION

This invention relates generally to nuclear waste handling, and more particularly to nuclear waste separation and collecting.

BACKGROUND OF THE INVENTION

Nuclear power stations have been an important energy source for our society for many years. With so many different kinds of nuclear reactors being around the world, the pollution of the radioactive wastes and also the possibility of disastrous accidents have been an important issue. The Chernobyl reactor accident of 1986 resulted in exposure to high radiation doses for some people, well above the lethal level. It also gave millions of people all across Europe increased radiation as compared to the natural background levels. Thousands would eventually die prematurely. In 1993 more than 10 percent of Ukraine's national budget was used for cleaning up after the accident.[1]

[1] Washington Post, Oct. 22, 1993.

With the end of the Cold War, eliminating the environmental problems created by the nuclear weapons becomes an emerging issue. A 1991 report by Congress's Office of Technology Assessment found evidence that "air, groundwater, surface water, sediments, and soil, as well as vegetation and wildlife, have been contaminated at most, if not all, of the Department of Energy nuclear weapons sites."[2]

[2] Washington Post, Oct. 22, 1993.

With such large amount of contaminated waste, conventional solidification or separation methods are not always practical. They are either too expensive, too bulky, too time-consuming, or cause other chemical contamination.

Numerous efforts have been undertaken regarding solid nuclear waste treatment. Several processes have been developed for separation and solidification of the radioactive waste. One process is an encapsulation method developed by Brookhaven National laboratory. Low density polyethylene is heated above their melting point and mixed with the radioactive waste. The whole system is then cooled down and the waste is therefore solidified. The polyethylene provides greater long-term stability than concrete and asphalt, which were popular materials for solidification, since polyethylene is an inert, low permeability plastic that is highly resistant to chemical attack, biodegradation, and radiation damage. However, this process does not provide for separation of radioactive and non-radioactive wastes. Thus, the volume of the waste is not reduced. It is also difficult to perform the process in an emergency situation.

Another process has been developed by Westinghouse Electric Corp. to separate the particles by using radiation detecting devices and mechanical separating devices.[3] Waste particles are scanned individually and then separated to different collectors based on their radiation. The process involves large and complex machinery and is not practical for small particle separation.

Washington Post, Oct. 22, 1993.

It is clear that there is a need in the art for a process that can separate radioactive particles from solid waste highly selectively, completely, rapidly, and inexpensively.

SUMMARY OF THE INVENTION

The present invention provides a selective polymer-wrapping process capable of exclusively wrapping radioactive particles from solid waste streams at room temperature. Accordingly, separation of wrapped radioactive particles from unwrapped non-radioactive particles is facilitated. The method includes exposing radioactive particles or material, alone or in combination with other materials, to a precursor monomer solution that is capable of polymerizing due to the inherent radiation of the radioactive material, whereby the radioactive material is partially or totally encapsulated in the resultant polymer.

BRIEF DESCRIPTION OF THE DRAWINGS

Numerous other advantages and features of the present invention will become readily apparent from the following detailed description of preferred embodiments when read in conjunction with the accompanying drawings, wherein.

DETAILED DESCRIPTION OF THE ILLUSTRATIVE EMBODIMENTS

The present invention provides a selective polymer-wrapping process capable of exclusively wrapping radioactive particles from liquid or solid waste streams at room temperature. Accordingly, separation of wrapped radioactive particles from unwrapped non-radioactive particles is facilitated. The selective polymer-wrapping process is based on utilizing inherent radiation characteristics of the material to be wrapped as a polymerization initiator. Polymer is formed in-situ around radioactive particles. Around the non-radioactive particles, no polymer is formed. This kind of high selectivity is realized by utilizing the radiation from radioactive particles as the sole source to generate radicals for the polymerization.

In general, a precursor monomer solution is applied to the radioactive waste. The waste can be in a solid, liquid or gaseous form. The radiation from the waste particles initiates the polymerization process. Polymers will be formed and only formed on these radioactive particles. These wrapped particles can then be separated or/and collected based on known methods.

The waste including radioactive particles may be exposed to the precursor monomer solution by a variety of methods. For example, if the waste is in solid form, the waste may be sprayed with a solution or the solution may be poured on the waste, whereby the radiation from the radioactive waste particles initiates the polymerization process to form polymers on the radioactive particles, ultimately to encapsulate the particle. Alternatively, the waste may be provided in a liquid form, for example in a suspension slurry, and treatment may occur by simply adding the precursor monomer solution, or pure or substantially pure monomers, to the slurry. Further, the radioactive waste may be in the form of an exhaust gas, whereby treatment may take place by spraying or otherwise incorporating the monomer solution to the exhaust gas, such that the radioactive particles are polymer encapsulated and may be more readily filtered or otherwise separated (e.g., due to the increased mass added by the polymer to the radioactive particles).

Figure 1:
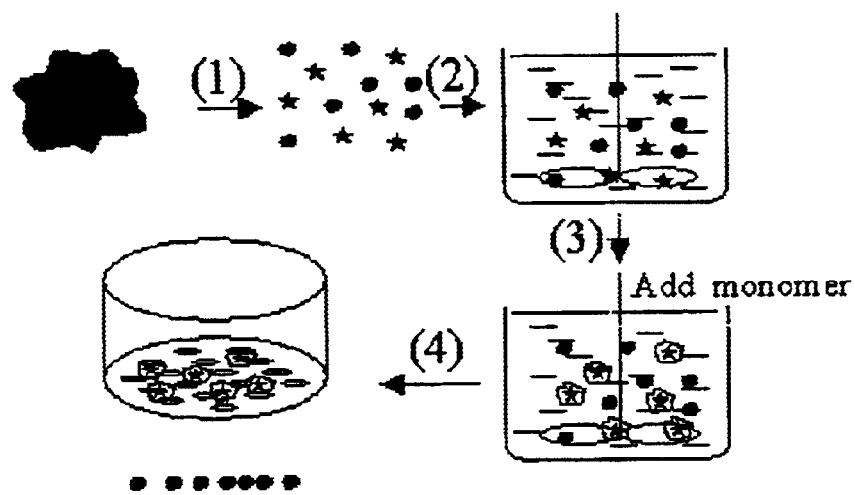
FIG. 1 is a schematic depiction of the selective polymer wrapping process applied to a material stream including radioactive and non-radioactive particles.

Referring now to the drawings, FIG. 1 is a schematic depiction of the selective polymer wrapping process applied to a solid material including radioactive and non-radioactive matter. First, the solid waste is crushed into a predetermined particle size or size range. The solid waste particles are then suspended in water, for example, with the assistance of a mechanical agitator or bubbler. A precursor monomer solution is then added to the system, and encapsulating polymers are formed around the radioactive particles. The radioactive particles and the non-radioactive particles then may be separated, for example, with a sieve. The liquid may be reused for next batch of waste, in which the remaining monomers will be measured for their concentration in order to decide how much new monomer is needed to replenish the solution.

In addition to utilizing the precursor solution in a predefined process, various systems may be used for emergency handling operations based on the precursor monomer solutions and process described herein. For example, a precursor monomer solution may be stored in a tank for emergency usage. For example, the tank may be in a form similar to a conventional fire extinguisher. Because of the easy handling, the process can be used for emergency situation when radioactive material leaks from a reactor or a container. Of course, other variants are possible, such as an automated response system including one or more tanks having a precursor monomer solution therein associated with suitable plumbing and controls directed to possible future response locations. In any event, upon exposure to the radioactive particles within the waste, polymer will form from the inherent radiation within a few minutes or even in seconds, and confine the radioactive material.

A further application of the selective polymer-wrapping process is for nuclear material mining. The process is similar to the removal of radioactive waste. An advantage of this process is that the polymer formed on the surface of radioactive particles can be made very soft with the appropriate precursor solution, such as a hydrogel solution. Thus, a lot of water is in the polymer matrix. Since a hydrogel can absorb a thousand times their dry weight in water, not much polymer is needed to reach certain volume. The water can be forced out by mechanical means, and the remaining polymer can be easily burned or otherwise removed for collecting the enriched nuclear material.

The solution generally comprises any monomer or monomer solution capable of initiating polymerization based on the inherent radioactivity of the radioactive portions of the waste. Generally, this monomer or monomer solution comprises about 5% to about 100%, preferably about 10% to about 90%, and more preferably about 20% to about 70% by weight, of the total monomer solution (prior to polymerization). Optionally, one or more additives may be included in the solution, including crosslinking agents, reinforcing element, photo-initiators, surfactants, or a combination comprising at least one of the foregoing additives. Crosslinking agents may generally comprise about 0.01% to about 15%, preferably about 0.5% to about 5%, and more preferably about 1% to about 3% by weight, of the total monomer solution (prior to polymerization). Reinforcing elements may generally comprise about 0% to about 30%, preferably about 1% to about 10%, and more preferably about 1% to about 4% by weight, of the total monomer solution (prior to polymerization). Photo-initiators and surfactants may also be added in photo-initiation effective amounts.

The solution can be an aqueous solution, or based on another suitable non reactive organic solvent (i.e., non reactive with selected monomers or other agents) such as ketones, alcohols, benzene, acetonitriles, DMF (dimethyl formaldehyde), chloroform, and the like, and combinations comprising at least one of the foregoing solvents (including water).

The aqueous solution may be a hydrogel solution, thus forming hydrogel polymers around the radioactive particles.

Solution polymerization is a homogenous process in which the starting monomers are dissolved in a solvent where the polymerization process is intended to occur. The addition of an inert solvent lowers the viscosity of the system, which helps with heat transfer and reduces the likelihood of autoacceleration taking place. The effective concentration of monomer can be easily controlled, therefore the rate of polymerization and the degree of polymerization can also be easily controlled. Since the freshly formed polymer contains solvent, the volume of the product polymer is usually larger than the similar product of a bulk polymerization process.

Crosslinked hydrophilic polymer networks that swell in water without dissolving and at the same time exhibit the ability to keep the water under external pressure are referred to as hydrogels. Hydrogels can have the capacity to absorb up to one thousand times their dry weight in water, and are widely used for diapers and as water absorbents in medical, chemical, and agricultural applications. Cross-linked poly (sodium acrylate) is a common superabsorbent polymer. The dramatic swelling power of these superabsorbent gels is a result of the electrostatic repulsion between the charges along the polymer chains and of the osmotic pressure of the counter ions. Hydrogels can be formed through solution polymerization using water as the solvent, following the free radical vinyl polymerization mechanism. The process can be initialized by free radical initiators. The free radicals for initiation can also be directly generated by high energy radiation such as γ-ray or particulate radiation such as α- or β-particles.[4] These sources of radiant energy are non-selective and produce a wider array of initiating species. Although these high-energy radiations produce both ionic and free-radical species, the polymerizations that are so initiated follow the free-radical mechanism almost exclusively. Although they are not popular initiating approaches for conventional polymerization process, they have been widely used in polymer industry for graft polymerization. 6 Washington Post, Oct. 22, 1993.

Not only will the radiation initialize the polymerization reaction, but the polymer can also be formed as a certain thickness of layer over the radioactive particles. While not wishing to be bound by theory, it is believed by the inventor herein that a polymer of a certain thickness can be formed as a layer of a certain thickness over the radioactive particles based on the fact that for a point radiation source, the radiation intensity I at distance x to the source is proportional to the reciprocal of $x^2$:

$$I \propto \frac{1}{x^2}$$

If we take a simple case that there are only two identical radioactive particles in the system with a distance of r apart, the radiation intensity profile between these two particles should be:

$$I \propto \frac{1}{x^2} + \frac{1}{(r-x)^2}$$

Figure 2:
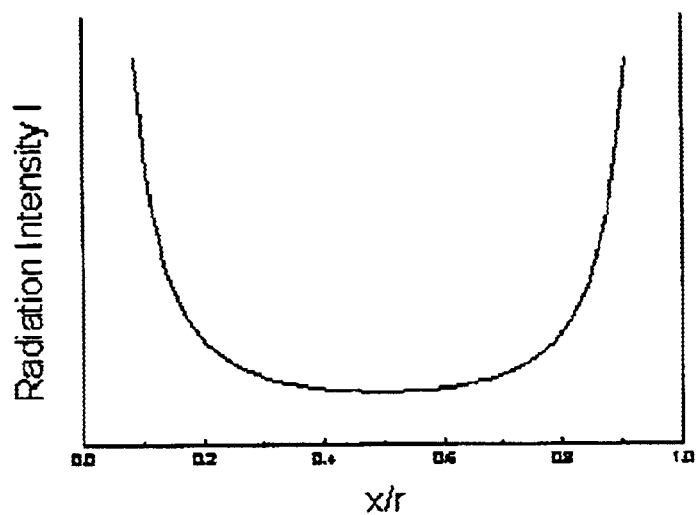

This is shown in FIG. 2, which clearly shows that the radiation intensity is not uniform at microscope scale. It is much higher at closer distances to the radioactive particles and drops quickly with the distance increases. This local high radiation intensity provides the foundation of initializing and preceding the polymerization just around the radioactive particles. Thus, if the activity of the chemical system is right, polymerization reaction shall only occur at the space around the radioactive particles, where the radiation density is the highest. In the bulk solvent away from the radioactive particles, even if very close to non-radioactive particles, since the radiation density is much lower, no polymerization reaction shall occur. The radioactive particles then have a polymer layer around them, making them larger than non-radioactive particles.

Since we use hydrogel to generate the volume change, and most weight of the formed hydrogel chunk is in fact water, very little chemicals are actually needed for the separation. Further more, unreacted chemicals may be easily filtered out and reused.

One suitable type of monomer solution, particularly for aqueous solutions, comprises one or more monomers selected from the group of water-soluble, ethylenically-unsaturated acids and acid derivatives. The water soluble ethylenically unsaturated acids and acid derivatives may generally have the following formula:

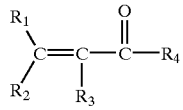

(1)

R1, R2 and R3 may be independently selected from, but are not limited to, the group consisting of H, C, C2–C6 alkanes, C2–C6 alkenes, C2–C6 alkynes, aromatics, halogens, carboxylic acid derivatives, sulfates and nitrates;

R4 may be selected from, but is not limited to, the group consisting of NR5, NHR5, NH2, OH, H, halides including but not limited to Cl and Br, OR5, and carboxylic acid derivatives, wherein R5 may be selected from the group consisting of H, C, C2–C6 alkanes, C2–C6 alkenes, C2–C6 alkynes, and aromatics.

Such ethylenically unsaturated acids and derivatives having the general formula (1), include, but are not limited to, methylenebisacrylamide, acrylamide, methacrylic acid, acrylic acid, acrylic amide, fumaramide, fumaric acid, N-isopropylacrylamide, N, N-dimethylacrylamide, 3,3-dimethylacrylic acid, maleic anhydride, and combinations comprising at least one of the foregoing ethylenically unsaturated acids and derivatives.

Other ethylenically unsaturated acids and derivatives monomers having readily polymerizable groups may be used as this type of monomer, depending on the desired properties. Such monomers include, but are not limited to, 1-vinyl-2-pyrrolidinone, the sodium salt of vinylsulfonic acid, and combinations comprising at least one of the foregoing ethylenically unsaturated acids and derivatives.

An optional crosslinking agent, particularly in an aqueous solution, may also be provided. One type of such as suitable crosslinking agent generally include monomers having the general formula:

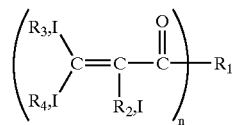

(2)

wherein i=1 n, and n is greater than or equal to 2;

R2,i, R3,i, and R4,i may be independently selected from, but are not limited to, the group consisting of H, C, C2–C6 alkanes, C2–C6 alkenes, C2–C6 alkynes, aromatics, halogens, carboxylic acid derivatives, sulfates and nitrates;

R1 may be selected from, but is not limited to, the group consisting of N, NR5, NH, O, and carboxylic-acid derivatives, wherein R5 may be selected from the group consisting of H, C, C2–C6 alkanes, C2–C6 alkenes, C2–C6 alkynes, and aromatics.

Suitable monomers for use generally as crosslinking agents of the above general formula (2) include methylenebisacrylamide, ethylenebisacrylamide, any water-soluble N,N'-alkylidene-bis(ethylenically unsaturated amide), and 1,3,5-Triacryloylhexahydro-1,3,5-triazine.

A suitable reinforcing element, particularly for aqueous monomer solutions, includes a water soluble or water swellable polymer. The water soluble or water swellable polymer may comprise polysulfone (anionic), poly(sodium-4-styrenesulfonate), carboxymethyl cellulose, polysulfone (anionic), sodium salt of poly(styrenesulfonic acid-co-maleic acid), corn starch, any other water-soluble or water-swellable polymers, or combinations comprising at least one of the foregoing polymers. The addition of the reinforcing element enhances the mechanical strength of the polymer formed around the radioactive particles.

Suitable photo-initiators include, but are not limited to, disulfides, benzoin, benzil, 1-phenyl-2-methyl-2-hydroxypropanone, 4,4'-diazidostilbene-2,2'-disulfonic acid disodium salt, benzenediazonium 4-(phenylamino)-sulfate, formaldehyde, 2-(2-(vinyloxy)ethoxy)-ethanol, and combinations comprising at least one of the foregoing photo-initiators. These initiators may be combined with charge-transfer compounds, such as triethanolamine, to enhance activity.

For aqueous monomer solutions, polymerization may be carried out at temperatures ranging from slightly above the freezing point of water to less than 100° C. In certain embodiments, polymerization may be heat induced, wherein an elevated temperature, ranging from about 75° to about 100° C., is used.

Suitable monomers for user with any of the above organic solvents include any monomer that is polymerizable by gamma radiation. For example, styrene or styrene based monomers that are soluble in the selected solvent, are suitably polymerizable by gamma radiation. Other monomers include, but are not limited to, isoprene, methyl methacrylate, 4-methylsterene, acrylonitrile, vinyl acetate, and any chemicals that can be polymerized through free radical polymerization process and are liquid itself or are soluble in an appropriate liquid solvent. Further, photo-initiators may be used in organic solvent based systems, including but not limited to disulfides, benzoin, and benzil.

The precursor monomer solution may further include other additives in effective quantities to facilitate separation and/or collection. For example, dyes may be added to aid visual or optical based separation and/or collection. Heavy powders additives may be added to aid mass based separation and/or collection. Further, magnetic materials may be added to aid magnetic or electromagnetic based separation and/or collection.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of partially or completely encapsulating radioactive particles comprising:
    exposing radioactive particles or material, alone or in combination with other materials, to a precursor monomer solution that is capable of polymerizing in situ due to the inherent radiation of the radioactive material, whereby the radioactive material is partially or totally encapsulated in the resultant polymer
    wherein the precursor monomer solution comprises one or more monomers selected from the group consisting of water-soluble, ethylenically-unsaturated acids and acid derivatives; and a crosslinking agent; and
    wherein the crosslinking agent is selected from the group consisting of methylenebisacrylamide, ethylenebisacrylamide, any water-soluble N,N'-alkylidene-bis(ethylenically unsaturated amide), 1,3,5-Triacryloylhexahydro- 1,3,5-triazine, and combinations comprising at least one of the foregoing crosslinking agents.

2. The method as in claim 1, wherein the precursor monomer solution comprises monomers capable of forming hydrogel polymers.

3. The method as in claim 1, wherein the precursor monomer solution comprises one or more monomers selected from the group of water-soluble, ethylenically-unsaturated acids and acid derivatives.

4. The method as in claim 3, wherein the water soluble ethylenically unsaturated acids and acid derivatives have the general formula:

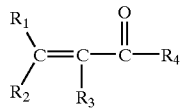

wherein R1, R2, and R3 are independently selected from the group consisting of H, C, C2–C6 alkanes, C2–C6 alkenes, C2–C6 alkynes, aromatics, halogens, carboxylic acid derivatives, sulfates and nitrates; and
    R4 is selected from the group consisting of NR5, NHR5, NH2, OH, H, halides, OR5, and carboxylic acid derivatives, wherein R5 is selected from the group consisting of H, C, C2–C6 alkanes, C2–C6 alkenes, C2–C6 alkynes, and aromatics.

5. The method as in claim 3, wherein the water soluble ethylenically unsaturated acids and acid derivatives are selected from the group consisting of methylenebisacrylamide, acrylamide, methacrylic acid, acrylic acid, fumaramide, fumaric acid, N-isopropylacryamide, N, N-dimethylacrylamide, 3,3-dimethytacrylic acid, maleic anhydride, and combinations comprising at least one of the foregoing ethylenically unsaturated acids and derivatives.

6. The method as in claim 1, wherein the crosslinking agent is of the general formula:

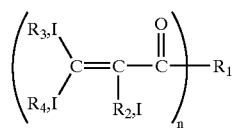

wherein i=1→n, and n>2;

R2,i, R3,i, and R4,i are independently selected from the coup consisting of H, C, C2–C6 alkanes, C2–C6 alkenes, C2–C6 alkynes, aromatics, halogens, carboxylic acid derivatives, sulfates and nitrates;
    R1 is selected from the group consisting of N, NR5, NH, O, and carboxylic-acid derivatives, wherein R5 is selected from the group consisting of H, C, C2–C6 alkanes, C2–C6 alkenes, C2–C6 alkynes, and aromatics.

7. The method as in claim 1, wherein the precursor monomer solution further comprises a reinforcing element.

8. The method as in claim 7, wherein the reinforcing element comprises a water-soluble or water-swellable polymer is selected from the group consisting of polysulfone (anionic), poly(sodium-4-styrenesulfonic), carboxymethyl cellulose, polysulfone (anionic), sodium salt of poly(styrenesulfonic acid-co-maleic acid), corn starch, any other water-soluble or water-swellable polymers, and combinations comprising at least one of the foregoing polymers.

9. The method as in claim 1, wherein the precursor monomer solution further comprises a photo-initiator.

10. The method as in claim 9, wherein the photo-initiator is selected from the group of photo-initiators consisting of disulfides, benzoin, benzil, 1-phenyl-2-methyl-2-hydroxypropanone, 4,4diazidostilbene-2,2'-disulfonic acid disodium salt, benzenediazonium 4-(phenylamino)-sulfate, formaldehyde, 2-(2-(vinyloxy)ethoxy)-ethanol, and combinations comprising at least one of the foregoing photo-initiators.

11. The method as in claim 1, wherein the precursor monomer solution further comprises an aqueous solvent.

12. The method as in claim 1, wherein the precursor monomer solution further comprises an organic solvent.

13. The method as in claim 12, wherein the precursor monomer solution further comprises a monomer selected from the group consisting of styrene, isoprene, methyl methacrylate, 4-methylsterene, acrylonitrile, vinyl acetate, and combinations comprising at least one of the foregoing monomers.

14. The method as in claim 1, wherein the precursor monomer solution further comprises to facilitate separation and/or collection selected from the group consisting of dyes, heavy powders, and magnetic materials.

15. A method of separating a radioactive particles from a combination of radioactive particles and non-radioactive particles comprising:
    exposing the combination to a precursor monomer solution that is capable of polymerizing in situ due to the inherent radiation of the radioactive material, whereby the radioactive material is partially or totally encapsulated in the resultant polymer, and separating the encapsulated radioactive particles from the non-radioactive particles wherein the precursor monomer solution comprises one or more monomers selected from the group of water-soluble, ethylenically-unsaturated acids and acid derivatives and a crosslinking agent; and
    wherein the crosslinking agent is selected from the group consisting of methylenebisacrylamide, ethylenebisacrylamide, any water-soluble N,N'-alkylidene-bis(ethylenically unsaturated amide), 1,3,5-Triacryloylhexahydro-1,3,5-triazine, and combinations comprising at least one of the foregoing crosslinking agents.

* * * * *